(12) United States Patent
Nakatani et al.

(10) Patent No.: US 10,965,833 B2
(45) Date of Patent: Mar. 30, 2021

(54) CONNECTION SYSTEM, IMAGE PROCESSING APPARATUS, AND COMMUNICATION METHOD

(71) Applicant: SHARP KABUSHIKI KAISHA, Sakai (JP)

(72) Inventors: Yuusuke Nakatani, Sakai (JP); Hiroki Munetomo, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/726,700

(22) Filed: Dec. 24, 2019

(65) Prior Publication Data

US 2020/0213469 A1    Jul. 2, 2020

(30) Foreign Application Priority Data

Dec. 27, 2018 (JP) .............................. JP2018-245579

(51) Int. Cl.
  *H04N 1/32*       (2006.01)
  *H04N 1/00*       (2006.01)
  *H04N 1/327*      (2006.01)

(52) U.S. Cl.
  CPC ..... *H04N 1/32587* (2013.01); *H04N 1/00307* (2013.01); *H04N 1/32793* (2013.01); *H04N 2201/0094* (2013.01); *H04N 2201/3205* (2013.01); *H04N 2201/3208* (2013.01); *H04N 2201/3209* (2013.01)

(58) Field of Classification Search
  CPC ........... H04N 1/32587; H04N 1/00307; H04N 1/32793; H04N 2201/3208; H04N 2201/0094; H04N 2201/3209; H04N 2201/3205

USPC ......................................................... 358/1.15
  See application file for complete search history.

(56) References Cited

U.S. PATENT DOCUMENTS

| | | | | |
|---|---|---|---|---|
| 5,467,441 | A | * | 11/1995 | Stone .................... G06T 3/0018 345/619 |
| 7,155,522 | B2 | | 12/2006 | Iyoki |
| 7,664,555 | B2 | * | 2/2010 | Kawai .................. H04N 1/0049 700/17 |
| 2008/0180457 | A1 | * | 7/2008 | Yamazaki ............... G06F 16/54 345/619 |

(Continued)

FOREIGN PATENT DOCUMENTS

| | | |
|---|---|---|
| JP | H11-127298 A | 5/1999 |
| JP | 2002-232637 A | 8/2002 |

*Primary Examiner* — Tammy Paige Goddard
*Assistant Examiner* — Darryl V Dottin
(74) *Attorney, Agent, or Firm* — ScienBiziP, P.C.

(57) ABSTRACT

A connection system includes a terminal device and an image processing apparatus. The terminal device includes a first controller, a first communicator, and a first display. The image processing apparatus includes a second controller, a second communicator, and a second display. The first controller of the terminal device causes the first display to display information of the terminal device when the terminal device is connected to the image processing apparatus through the first communicator. The second controller of the image processing apparatus causes the second display to display the information of the terminal device when the terminal device is connected to the image processing apparatus through the second communicator.

10 Claims, 14 Drawing Sheets

(56) References Cited

U.S. PATENT DOCUMENTS

2008/0254888 A1\* 10/2008 Morio ................... A63F 13/40
463/42

\* cited by examiner

FIG. 3

| TERMINAL NAME | SESSION ID | RECEIVED SIGNAL STRENGTH |
|---|---|---|
| Taro Yamada's Smartphone | 1234567890 | -44dBm |
| Hanako's Smartphone | 9346213792 | -72dBm |
| ⋮ | ⋮ | ⋮ |

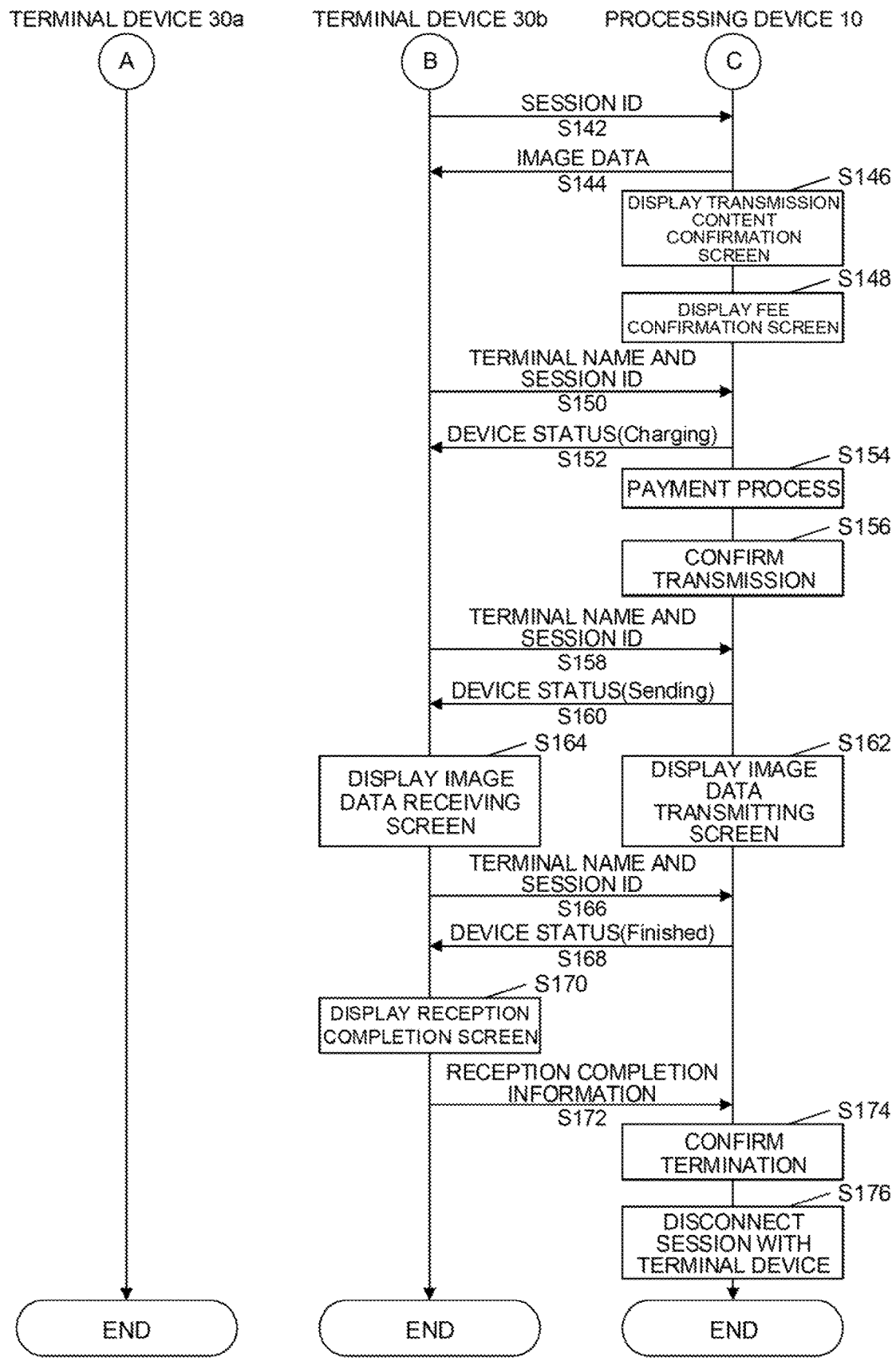

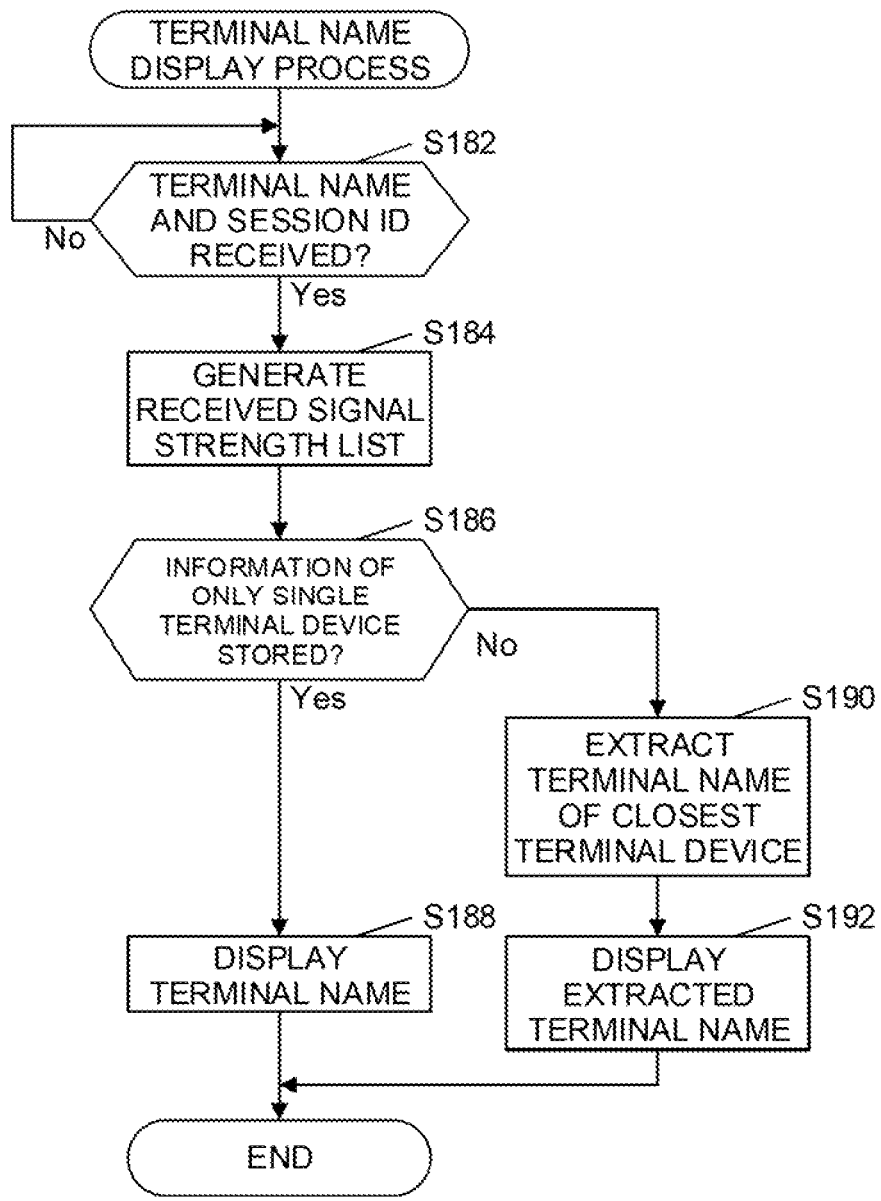

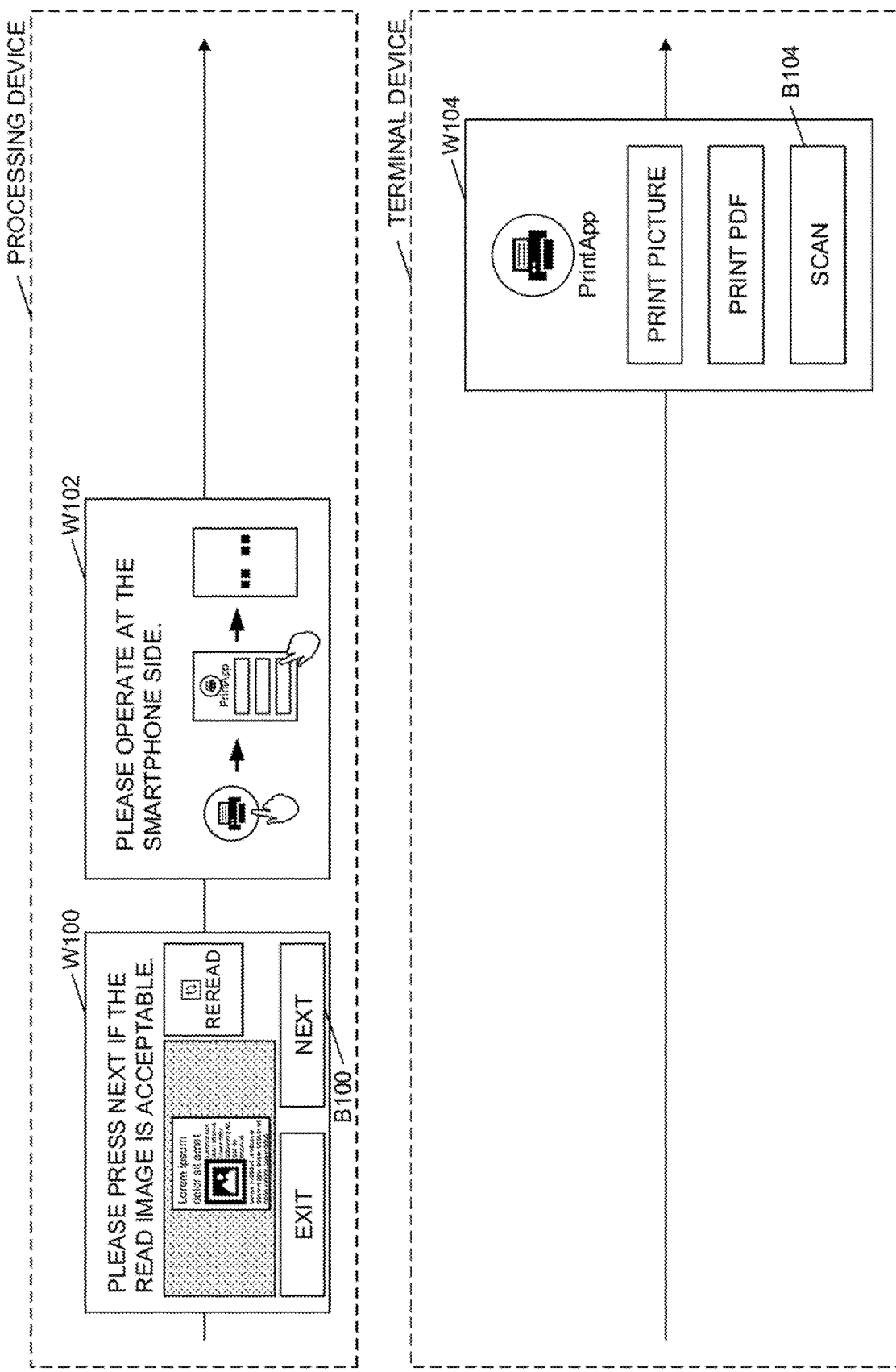

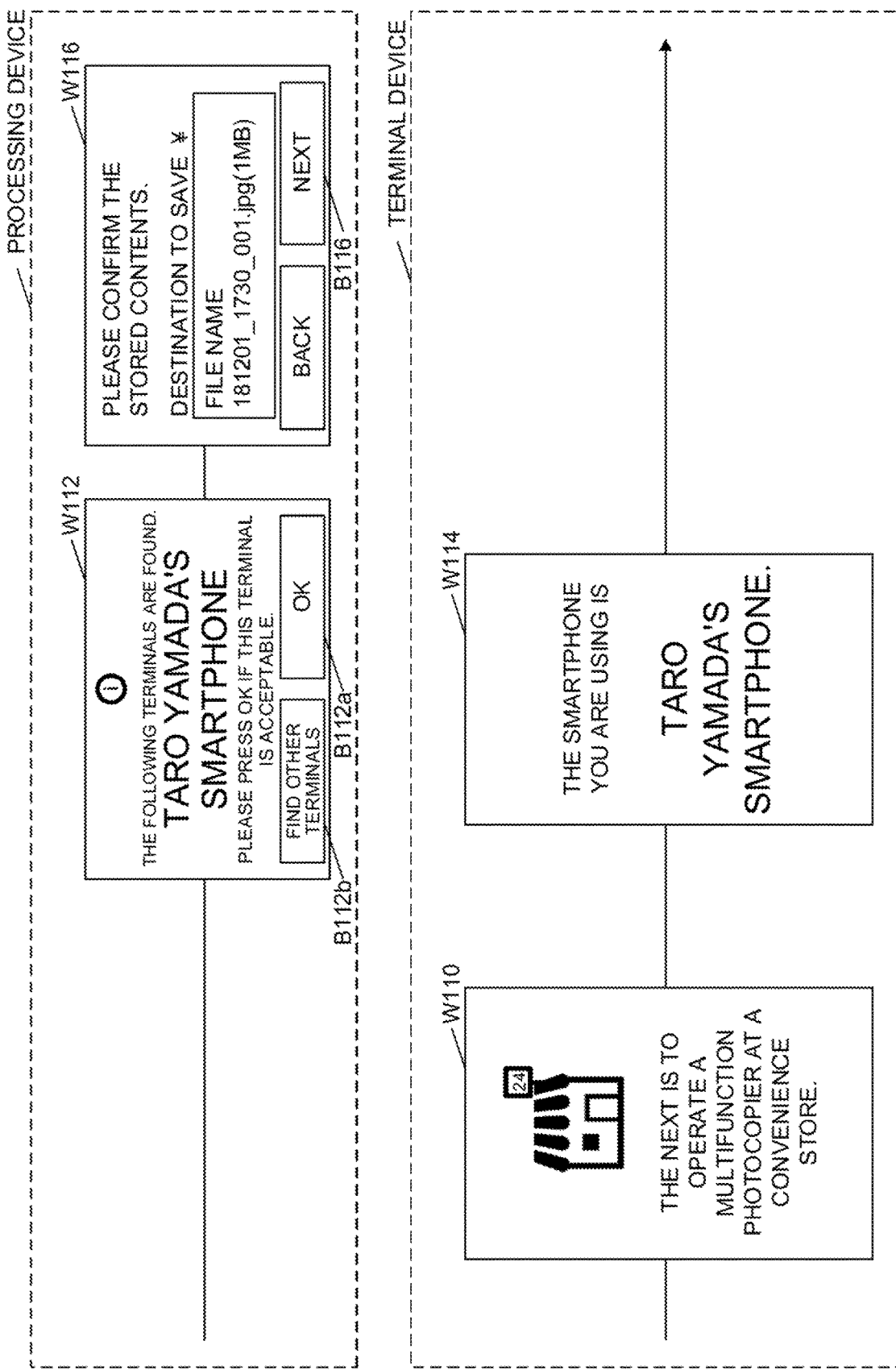

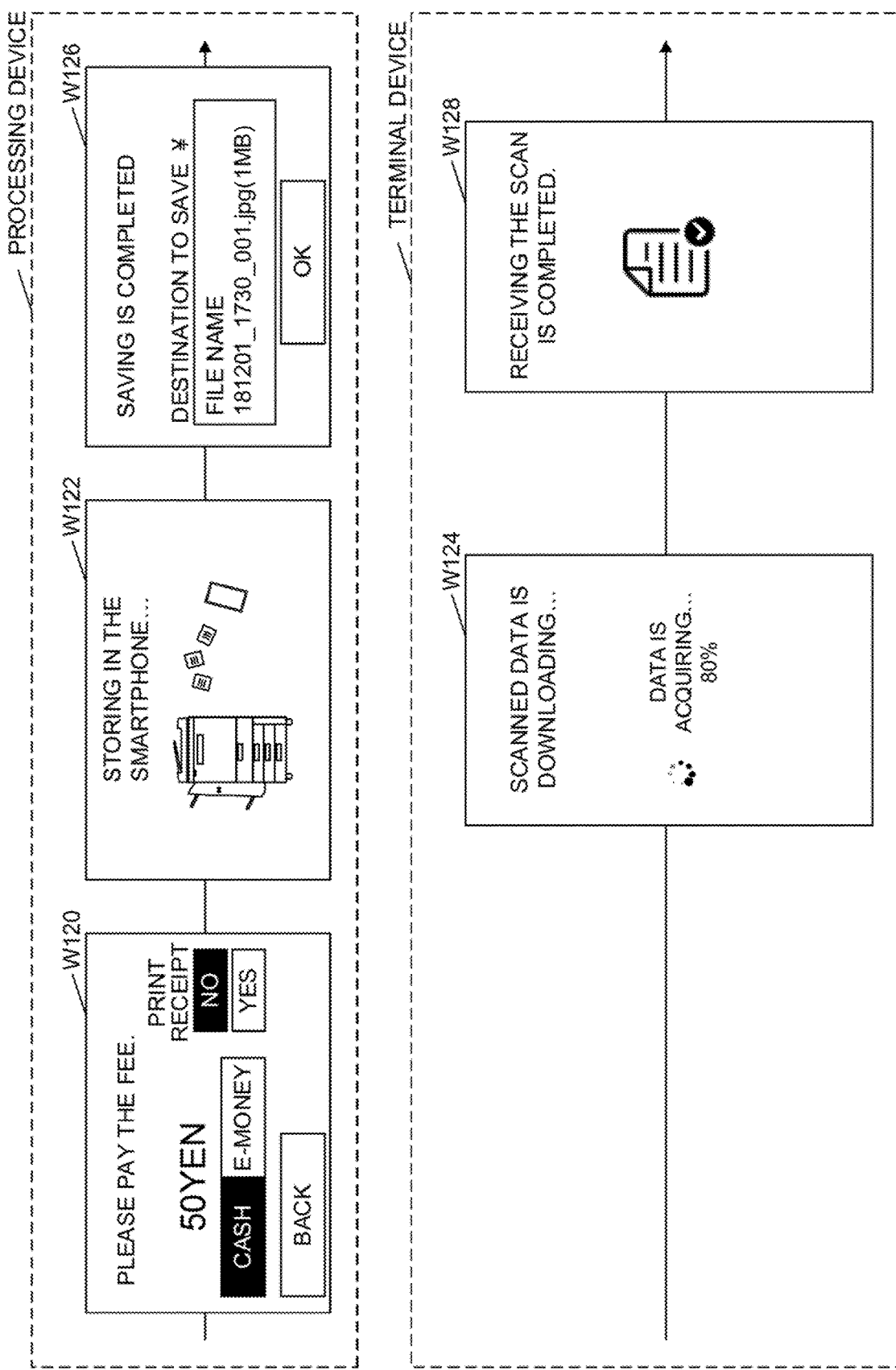

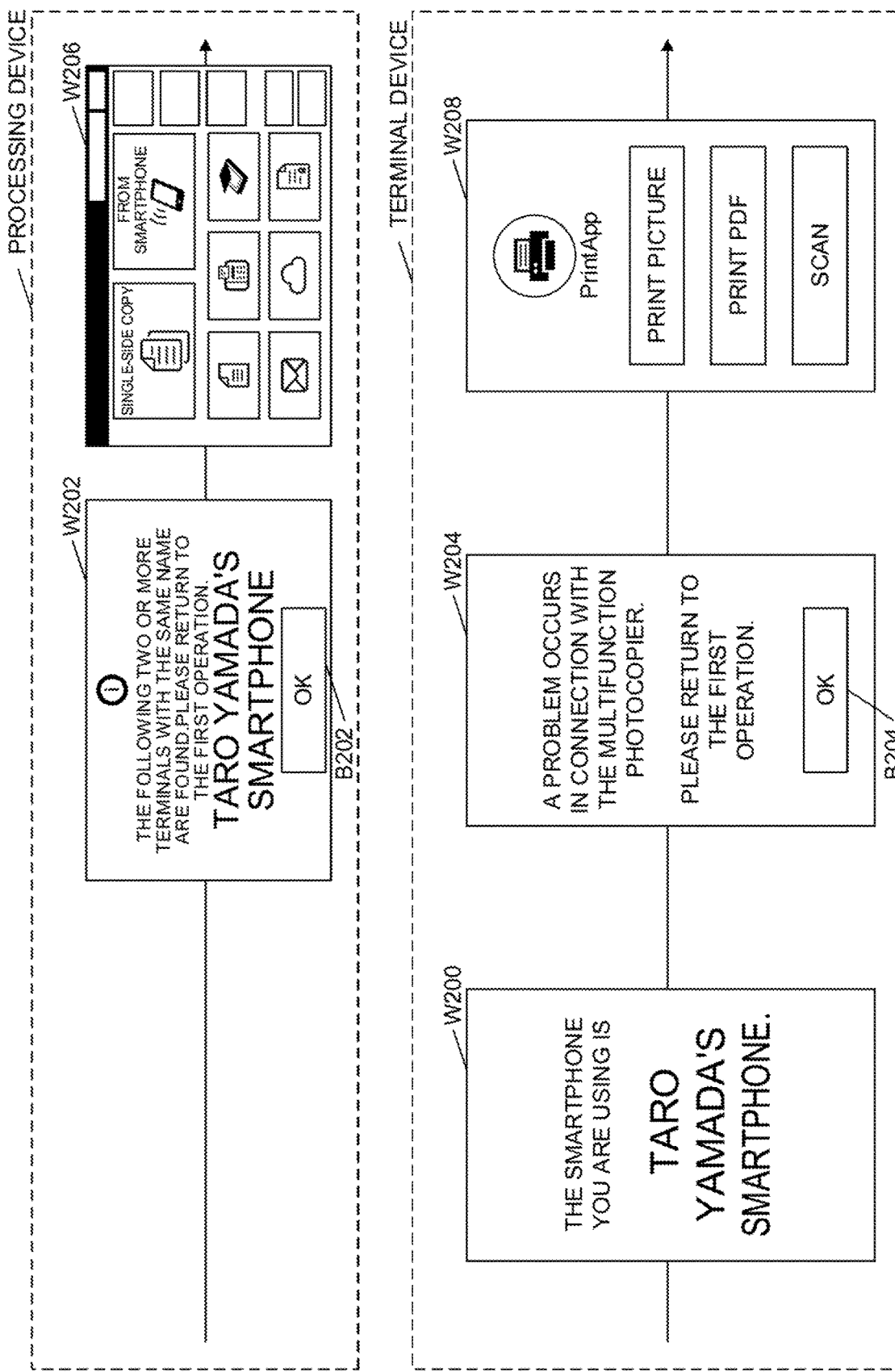

CONNECTION SYSTEM, IMAGE PROCESSING APPARATUS, AND COMMUNICATION METHOD

This non provisional application claims priority under 35 U.S.C. 119(a) on Patent Application No. 2018-245579 filed in Japan on 27 Dec. 2018, the entire contents of which are hereby incorporated by reference.

BACKGROUND OF THE INVENTION

Field of the Invention

The present invention relates to a connection system, an image processing apparatus, and a communication method.

Description of the Background Art

In connecting two devices, a user of one of the devices has typically been allowed to select a connection destination, that is, the other device, to connect the two devices (see, for example, Japanese Unexamined Patent Application Publication No. JP 11-127298 and Japanese Unexamined Patent Application Publication No. JP 2002-232637).

Japanese Unexamined Patent Application Publication No. JP 11-127298 and Japanese Unexamined Patent Application Publication No. JP 2002-232637 each disclose a technology that allows a user to select a terminal device to which a scanner is to be connected for transmission of image data by reference to a list or an address book. However, the technology disclosed in Japanese Unexamined Patent Application Publication No. JP 11-127298 or Japanese Unexamined Patent Application Publication No. JP 2002-232637 is problematic because a user who is not used to operating a device such as a scanner feels it difficult to select a connection destination device. In addition, the user cannot easily confirm whether or not the device to be connected is appropriate.

In view of the above problems, an object of the present invention is to provide a connection system and the like that allow a user to easily confirm that a connection source device and a connection destination device are connected.

SUMMARY OP THE INVENTION

In order to solve the above problems, a connection system according to the present invention includes:
a terminal device; and
an image processing apparatus,
the terminal device including:
a first controller;
a first communicator; and
a first display,
the image processing apparatus including:
a second controller;
a second communicator; and
a second display.
The first controller of the terminal device causes the first display to display information of the terminal device when the terminal device is connected to the image processing apparatus through the first communicator.
The second controller of the image processing apparatus causes the second display to display the information of the terminal device when the terminal device is connected to the image processing apparatus through the second communicator.

A control method according to the present invention is a control method for a connection system that includes:
a terminal device; and
an image processing apparatus,
the terminal device including:
a first controller;
a first communicator; and
a first display,
the image processing apparatus including:
a second controller;
a second communicator; and
a second display.
The control method includes:
causing the terminal device to display information of the terminal device on the first display when the terminal device is connected to the image processing apparatus through the first communicator, and
causing the image processing apparatus to display the information of the terminal device on the second display when the terminal device is connected to the image processing apparatus through the second communicator.

An image processing apparatus according to the present invention includes:
a communicator that is connected to a terminal device;
a controller; and
a display, the controller causing the display to display information of the terminal device when the terminal device is connected to the image processing apparatus through the communicator.

A communication method according to the present invention is a communication method for performing communication between an image processing apparatus and a terminal device. The communication method includes:
establishing the communication between the terminal device and the image processing apparatus;
displaying a terminal name of the terminal device on a display of the terminal device and a display of the image processing apparatus after the communication is established; and
transmitting image data from the image processing apparatus to the terminal device after identical terminal names are displayed on the display of the terminal device and the display of the image processing apparatus, respectively.

According to the present invention, a user can easily confirm that a connection source device and a connection destination device are connected.

BRIEF DESCRIPTION OF THE DRAWINGS

FIG. 3 is a diagram for explaining a data structure of a received signal strength list according to the first embodiment;

FIG. 5 is a diagram for explaining the flow of the process according to the first embodiment;

FIG. 6 is a flowchart for explaining a flow of a terminal name display process according to the first embodiment;

FIG. 7 is a diagram for explaining an operation example according to the first embodiment;

FIG. 8 is a diagram for explaining an operation example according to the first embodiment;

FIG. 9 is a diagram for explaining an operation example according to the first embodiment;

FIG. 13 is a diagram for explaining an operation example according to the second embodiment.

DESCRIPTION OF THE PREFERRED EMBODIMENTS

An embodiment of the present invention will be described below with reference to the drawings. In the present embodiment, it should be noted that a system including a processing device according to the present invention will be described as an example.

1. First Embodiment 1.1 Overall Configuration
1.1.1 System Configuration

Figure 1:
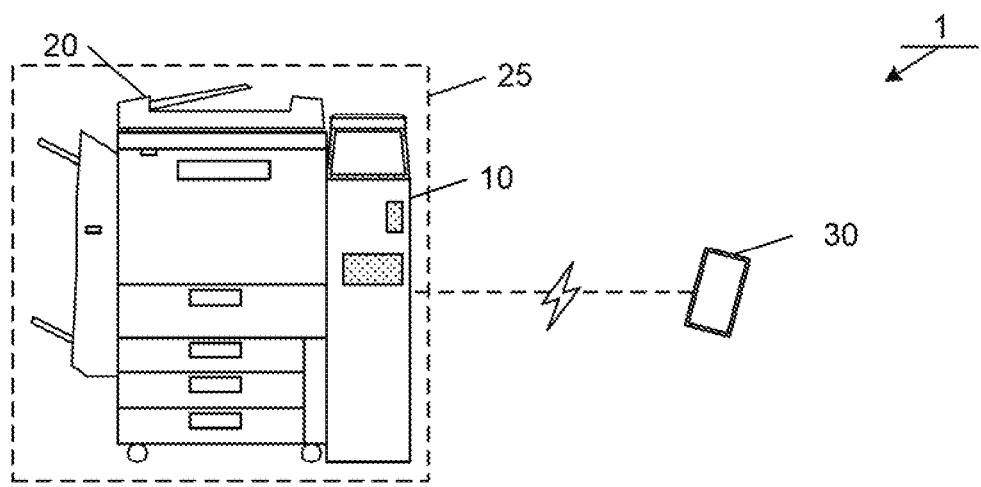
FIG. 1 is a diagram for explaining an overall configuration of an image data transmission system according to a first embodiment.

An overall configuration of a system 1 according to the present embodiment will be described with reference to FIG. 1. As illustrated in FIG. 1, the system 1 includes a processing device 10, an image forming device 20, and a terminal device 30. It should be noted that although FIG. 1 illustrates that the single terminal device 30 is connected to the processing device 10, a plurality of terminal devices 30 may be connected to the processing device 10. In addition, the processing device 10 and the image forming device 20 may be configured as an apparatus (for example, an image processing apparatus 25) including the processing device 10 and the image forming device 20.

The processing device 10 is a device connected to the image forming device 20. The image forming device 20 is a device that outputs an image by forming the image on recording paper or the like from externally inputted image data and such a device is referred to as a so-called multi-function machine. In the present embodiment, the processing device 10 and the image forming device 20 are connected by wire for mutual communication. The processing device 10 and the image forming device 20 are, for example, connected by a connection method based on the universal serial bus (USB) standards. It should be noted that the processing device 10 and the image forming device 20 may be connected by a connection method based on known standards such as institute of electrical and electronics engineers (IEEE) 1394 or recommended standard (RS) –232 or, alternatively, connected through a local area network (LAN). The processing device 10 and the image forming device 20 may be connected wirelessly.

In addition, the processing device 10 may charge for a service provided to a user. In this case, the processing device 10 may be connected to a fee collection device with a coin slot, a bill slot, a return button, a coin return port, and a bill return port for collecting a fee by cash.

The terminal device 30 is a portable information processing terminal device such as a smartphone or a tablet. The terminal device 30 is wirelessly connectable to another device through a wireless LAN. In the present embodiment, the processing device 10 also functions as a wireless LAN access point (parent device) to which a wireless LAN terminal (slave device), namely, the terminal device 30, is to be connected.

1.1.2 Overview of Image Transmission/Reception Service

In the present embodiment, the image processing apparatus 25 provides an image transmission/reception service. The image transmission/reception service is a service for transmitting/receiving image data between the image processing apparatus 25 and the terminal device 30. The description of the present embodiment focuses on a service for transmitting image data from the image processing apparatus 25 to the terminal device 30.

The terminal device 30 can receive image data from the processing device 10 by executing an application (image data receiving application) for using the image transmission/ reception service.

In the present embodiment, the service is provided as the image processing apparatus 25 (processing device 10) executes a program. The image transmission/reception service may be performed through the image processing apparatus 25 (processing device 10) by another server that provides another service, for example.

In the image transmission/reception service, transition of the following statues is to be caused.

1 Scanning
2 Connection of the Terminal Device 30 and Confirmation
3 Charging Process
4 Transmission of Image Data A brief description will be made below on the statuses.

1 Scanning

The image transmission/reception service enters a status for reading a document. In this status, a user of the image transmission/reception service causes the document, to be read by the image processing apparatus 25 (image forming device 20).

2 Connection of the Terminal Device 30 and Confirmation

Next, the image transmission/reception service causes the terminal device 30 to be connected to the image processing apparatus 25. The user operates the terminal device 30 to start the image data receiving application. The image data receiving application causes a display of the terminal device 30 to display terminal device information such as a terminal name. Likewise, a display of the image processing apparatus 25 also displays a terminal name. The user of the image transmission/reception service can confirm that the terminal device 30 of the user is connected to the image processing apparatus 25 by seeing that the terminal name displayed on the image processing apparatus 25 matches the terminal name displayed on the terminal device 30.

In response to a confirmation operation performed by the user, the image processing apparatus 25 may display information regarding image data to be transmitted on the display. For example, the image processing apparatus 25 displays file name, file capacity, or both of the image data to be transmitted by the image processing apparatus 25 may be displayed on the display. This allows the user to confirm information regarding the image data to be received.

3 Charging Process

When the user of the image transmission/reception service confirms that the information regarding the image data is correct, the image transmission/reception service enters a status for payment. At this time, the processing device 10 displays a charge fee. The user of the image transmission/ reception service puts cash sufficient for the charge fee as displayed. The charge fee may be paid by electronic money instead of cash, for example. Alternatively, the user nay print out a payment slip and pay the charge fee at a cashier after completion of the process. The charging process is a process from displaying a screen indicating the start of the payment to completing the payment.

4 Transmission of Image Data

In response that the user of the image transmission/reception service puts the cash sufficient for the charge fee, the image transmission/reception service performs a process of payment, entering a status for transmitting/receiving the image data. At this time, the display of the processing device 10 and the display of the terminal device 30 show that the image data is being transmitted/received. The user of the image transmission/reception service waits until the transmission/reception of the image data is completed. When the transmission/reception of the image data is completed, the image transmission/reception service enters a status for terminating the image transmission/reception service.

1.2 Functional Configuration

Figure 2:
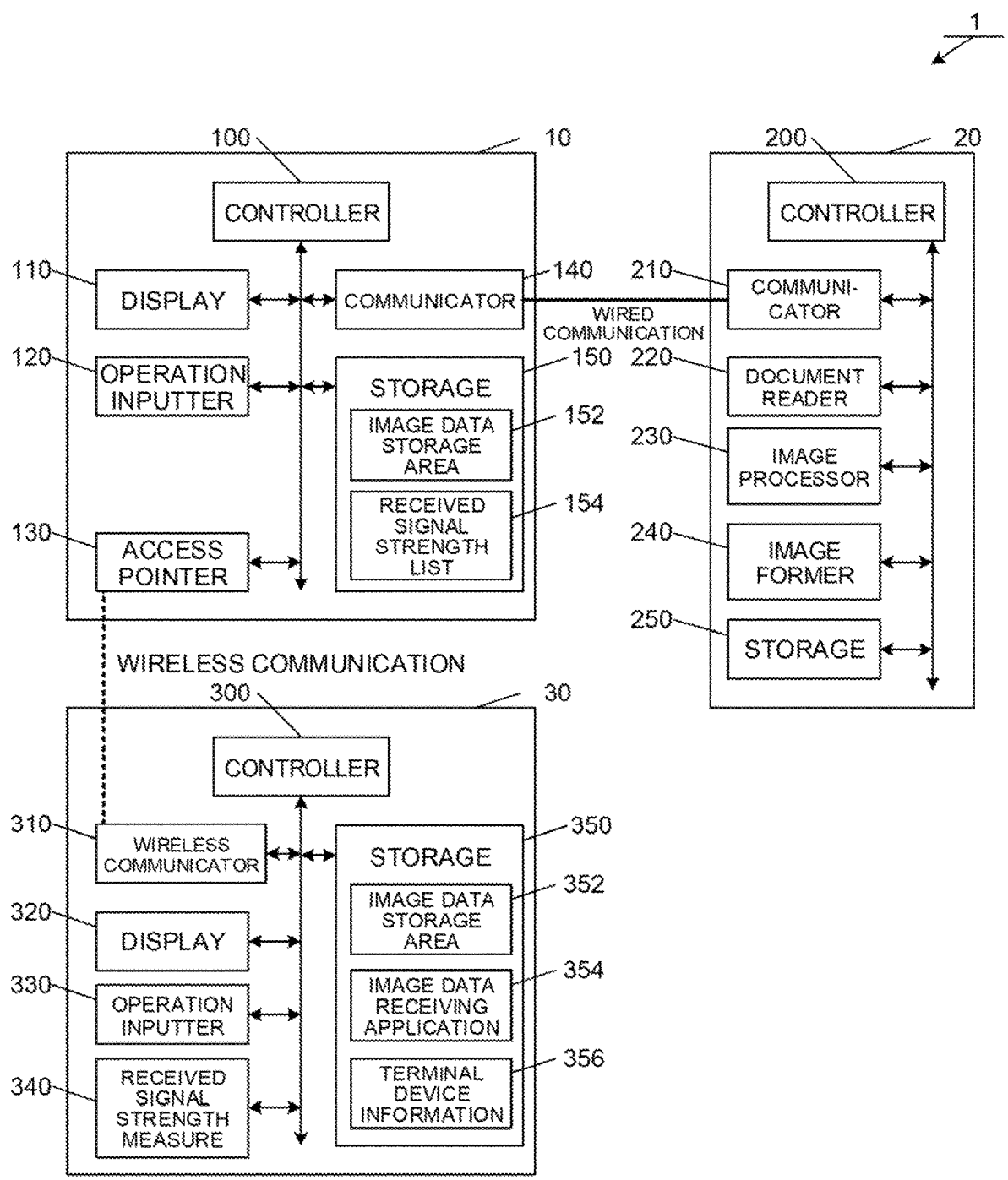
FIG. 2 is a diagram for explaining functional configurations of a processing device, an image forming device, and a terminal device according to the first embodiment.

With reference to FIG. 2, description will be made on functional configurations of the processing device 10 and the image forming device 20, which constitute the image processing apparatus 25 of the present embodiment, and the terminal device 30. A case where the processing device 10 of the image processing apparatus 25 provides the service will be described below.

1.2.1 Image Processing Apparatus

The processing device 10 includes a controller 100, a display 110, an operation inputter 120, an access pointer 130, a communicator 140, and a storage 150.

The controller 100 is a functional unit for controlling the processing device 10 as a whole. The controller 100 implements various functions by reading and executing various programs. For example, the controller 100 includes a single or a plurality of arithmetic devices such as central processing units (CPUs).

The display 110, which is a functional unit for displaying a variety of information to the user, includes a liquid crystal display (LCD), for example. Moreover, the operation inputter 120, which is a functional unit for receiving operation instructions from the user, includes such as a device that detects an input by touch. The display 110 and the operation inputter 120 may be integral in the form of a touch panel. An input to the touch panel may be detected by a typical detection method such as a resistive film method, an infrared method, an electromagnetic induction method, or a capacitance method. The display 110 and the operation inputter 120 may alternatively be provided in the image forming device 20.

The access pointer 130, which is a functional unit that enables the processing device 10 to function as an access point, functions as an access point for providing a wireless LAN network such as IEEE802.11a/b/g/n, for example. The wireless LAN network provided by the access pointer 130 is identified by a service set identifier (SSID). The terminal device 30 can be connected to the processing device 10 by designating the SSID of the wireless LAN provided by the access pointer 130 as a net work connection destination.

The communicator 140 is a functional unit that enables the processing device 10 to communicate with an external device by wire or wirelessly. The communicator 140 includes an input/output terminal such as a USB terminal, for example. Moreover, the communicator 140 may be connected to the external device through wireless communication. In this case, the communicator 140 may include a network interface card (NIC) usable for a wireless LAN or a communication module connectable to long term evolution (LTE)/LTE-advanced (LTE-A)/license-assisted access using LTE (LAA)/5G line.

The storage 150 is a functional unit that stores various programs and various data necessary for an operation of the processing device 10. The storage 150 may include a solid state drive (SSD), that is, a semiconductor memory, or a hard disk drive (HDD) or may, alternatively, include a compact recording medium removable from the processing device 10.

The storage 150, which has an image data storage area 152, that is, an area for storing image data, stores a received signal strength list 154, that is, a list regarding a strength of a received signal of the terminal device 30.

FIG. 3 is a diagram that illustrates an example of a data configuration of the received signal strength list 154 in the present embodiment. As illustrated in FIG. 3, the received signal strength list 154 stores, for each terminal device 30, a terminal name (for example, "Taro Yamada's Smartphone"), which is information of the terminal device 30, a session ID (for example, "1234567890") for identifying a session in wireless communication with the terminal device 30, and a received signal strength (for example, "−44 dBm"), which is a value representing a strength of a received signal, that is, a signal received from the processing device 10 by the terminal device 30.

Here, the information of the terminal device 30 is information regarding the terminal device 30. The information of the terminal device 30 includes, for example, the following information.

Unique information of the terminal device 30 (for example, a serial number, a media access control (MAC) address, and a terminal name of the terminal device 30)

Unique information related to the terminal device 30 (for example, international mobile equipment identifier (IMEI) associated with a subscriber identity module (SIM) card attached to the terminal device 30 and a telephone number)

Information of a user who uses the terminal device 30 (for example, user name, account name, and electronic mail address)

Information based on an operation of the terminal device 30 (for example, a battery charge remaining and a name of an operation system (OS) that operates in the terminal device 30)

Among the above pieces of information of the terminal device 30, the information that can uniquely identify the terminal device 30 is referred to as a terminal identifier. The terminal identifier may be information set by a user of the terminal device 30 or information stored in advance in the terminal device 30. Examples of the terminal identifier set by the user of the terminal device 30 include a terminal name, that is, a name of the terminal device 30, a user name, an electronic mail address, and a telephone number, and an address such as an internet protocol (IP) address. Examples of the terminal identifier stored in advance in the terminal device 30 include information that can uniquely identify the terminal device, such as a serial number, an IMEI, and a MAC address of the terminal device 30.

A session refers to a unit of communication performed for each image transmission/reception service between the processing device 10 and the terminal device 30. In the present embodiment, the session refers to a unit of communication where the processing device 10 transmits a single or a plurality of pieces of image data stored in the image data storage area 152 to the single terminal device 30. That is, the processing device 10 generates a session for the single terminal device 30 and transmits a single or a plurality of pieces of image data to the single terminal device 30 for which the session has been generated each time an image transmission/reception service is used by a user. It should be noted that the processing device 10 identifies the session by the session ID.

The session ID refers to information for uniquely identifying a session. The session ID is generated by an image data receiving application 354 stored in the terminal device 30. The session ID, which only needs to identify the session, includes a 10-digit number extracted at random, for example. The session ID may include a symbol such as an alphabet or a hyphen and the number of digits (the number of characters) of the session ID is not necessarily 10.

In the present embodiment, it should be noted that the expression "the session is established" means that the processing device 10 generates the session, getting ready for transmission of the image data to the terminal device 30, which is a target where the image data is to be transmitted.

1.2.2 Image forming Device

The image forming device 20 includes a controller 200, a communicator 210, a document reader 220, and an image processor 230, an image former 240, and a storage 250. It should be noted that the image forming device 20 may also include a display.

The controller 200 is a functional unit for controlling the image forming device 20 as a whole. The controller 200 implements various functions by reading and executing various programs. For example, the controller 200 includes a single or a plurality of arithmetic devices such as CPUs.

The communicator 210 is a functional unit that enables the image forming device 20 to communicate with an external device by wire or wirelessly. The communicator 210 includes an input/output terminal such as a USB terminal, for example. In the present embodiment, the image forming device 20 is connectable to the processing device 10 through the communicator 210.

The document reader 220 is a functional unit for reading a document placed on the image forming device 20 as image data. For example, the document reader 220 includes a scanner.

The image processor 230 is a functional unit that performs a variety of image processing on the image data, generating print data to be used by the image former 240 to form an image. For example, sharpening process and color conversion of the image data are performed as the image processing. In addition, the image processor 230 stores the generated print data in the storage 250.

The image former 240 is a functional unit for forming the print data on a recording medium (for example, recording paper). For example, the image former 240 includes a laser printer using an electrophotographic method.

The storage 250 is a functional unit that stores various programs necessary for the operation of the image forming device 20 and various data such as the print data generated by the image processor 230. For example, the storage 250 includes an SSD, that is, a semiconductor memory, or an HDD.

1.2.3 Terminal Device

The terminal device 30 includes a controller 300, a wireless communicator 310, a display 320, an operation inputter 330, a received signal strength measure 340, and a storage 350.

The controller 300 is a functional unit for controlling the terminal device 30 as a whole. The controller 300 implements various functions by reading and executing various programs. For example, the controller 300 includes a single or a plurality of arithmetic devices such as CPUs.

The wireless communicator 310 is a functional unit that is to be connected to the access pointer 130. For example, the wireless communicator 310 includes an NIC that, enables communication using a wireless LAN communication system according to any one of IEEE802.11a/b/g/n.

The display 320, which is a functional unit for displaying a variety of information to the user, includes an LCD, for example. The operation inputter 330, which is a functional unit for receiving operation instructions from the user, includes a device that detects an input by touch. The display 320 and the operation inputter 330 may be integral in the form of a touch panel and an input to the touch panel is detected by a capacitance method, for example.

The received signal strength measure 340 is a functional unit for measuring a strength of a signal received from the processing device 10, which is an access point, during the wireless communication implemented by the wireless communicator 310. The measured strength of the received signal is represented as a dBm value on the basis of a received signal strength indication (RSSI) value, for example.

In receiving a frame or packet such as a beacon transmitted from the access pointer 130, the received signal strength measure 340 measures a strength of a received signal of the received frame or packet. Moreover, in a case where an application programming interface (API) for acquiring a value of the strength of the received signal is called from an application, the received signal strength measure 340 returns the value of the strength of the received signal to the application from which the API has been called. The application executed by the controller 300 can thus acquire the value of the strength of the received signal measured by the received signal strength measure 340.

The storage 350 is a functional unit that stores various programs and various data necessary for the operation of the terminal device 30. For example, the storage 350 includes an SSD, that is, a semiconductor memory, or a flash memory.

The storage 350, which has an image data storage area 352, that is, an area for storing image data, stores the image data receiving application 354, which is an application for receiving image data from the processing device 10, and terminal device information 350, which is information regarding the terminal device.

The image data receiving application 354 is read and executed by the controller 300, thereby implementing a function for receiving image data from the processing device 10. Specific functions to be implemented by the image data receiving application 354 are as follows.

1 Function to Generate Session ID

This is a function to generate a session II). The controller 300 generates the session ID using a random number, for example. It should be noted that the controller 300 may generate the session ID by performing a predetermined calculation on time and terminal identifier information.

2 Function to Transmit Terminal Name/Session ID/Value of Strength of Received Signal This is a function to transmit the generated session ID, the terminal name stored in the terminal device information 356, and the value of the strength of the received signal to the processing device 10. It should be noted that the terminal name is information that is to be displayed on the processing device 10. Hence, as described above, the information of the terminal device 30 only needs to be transmitted to the processing device 10. Instead of the terminal name, the controller 300 may transmit a terminal identifier other than the terminal name or, alternatively, transmit information of the terminal device 30 other than the terminal identifier. Moreover, the value of the strength of the received signal may be acquired by calling the API for acquiring the strength of the received signal by the controller 300. It should be noted that the value of the strength of the received signal may be transmitted each time when the terminal name and the session ID are transmitted to the processing device 10 or, alternatively, transmitted at predetermined intervals (for example, once every three times).

The value of the strength of the received signal of the terminal device 30 may be provided in any manner other than the above as long as the processing device 10 acquires the value. For example, the controller 300 may transmit the value of the strength of the received signal to the processing device 10 at a time different from a time for transmitting a signal containing the terminal name and the session ID. In addition, the processing device 10 may measure or acquire the value of the strength of the received signal of the terminal device 30. The processing device 10 may acquire the strength of the received signal by, for example, estimating the value of the strength of the received signal of the terminal device 30 from a signal received by the processing device 10 from the terminal device 30. In a case where the processing device 10 acquires the value of the strength of the received signal of the terminal device 30, it is not necessary for the terminal device 30 to transmit the value of the strength of the received signal to the processing device 10.

3 Functions to Receive Status of Image Transmission/Reception Service and Display Screen The controller 300 functions to receive the status of the image transmission/reception service transmitted from the processing device 10 by transmitting a request for acquiring the status of the image transmission/reception service to the processing device 10 and display a screen corresponding to the status of the image transmission/reception service on the display 320. Regarding the function to display the screen, in a case where the image transmission/reception service is in a status where a terminal device to which the image data is to be transmitted has been determined, the controller 300 causes the display 320 to display a screen for prompting an operation with the processing device 10. It should be noted that the controller 300 may automatically switch the screen on the basis of a device status received from the processing device 10 irrespective of an operation of the terminal device 30 by the user or may, alternatively, switch the screen in accordance with the operation by the user.

In the present embodiment, it should be noted that the description is made on the assumption that the controller 300 transmits the session ID and the terminal name to the processing device 10 by the function 2 and the status of the image transmission/reception service is transmitted from the processing device 10 in response. In other words, the description is made on the assumption that the transmission of the session ID and the terminal name from the controller 300 to the processing device 10 corresponds to a request for acquiring the status of the image transmission/reception service. Thus, the function to receive the status of the image transmission/reception service, which is a part of the function 3, is implemented by receiving a response transmitted from the processing device 10 in the function 2. It should be noted that the controller 300 may separately implement the function 2 and the function 3. In this case, to allow the terminal device 30 to receive the status of the image transmission/reception service from the processing device 10, the controller 300 may transmit information for identifying a destination of the transmission of the image transmission/reception service, such as the IP address of the terminal device 30, to the processing device 10.

4 Function to Store Image Data

This is a function to store the image data transmitted from the processing device 10 in the image data storage area 352. In addition, in storing the image data, the image data may be processed in a predetermined manner. For example, the image data may be stored after added with attributes of the image data, such as date of reception of the image data and an installation location of the processing device 10 and the image forming device 20 (for example, a name of a store where the processing device 10 that provided the service to the user is installed). In addition, in a case of receiving the image data in the form of a compressed file from the processing device 10, a process for expanding the compressed file may be performed.

The terminal device information 356 stores, as information regarding the terminal device 30, information that may be a terminal identifier such as the terminal name and the serial number of the terminal device 30, the account name, the telephone number, or the electronic mail address. As described above, a part of the information stored in the terminal device information 356 may be set by the user of the terminal device 30.

It should be noted that the terminal name and the account name may be stored in the image data receiving application 354. This allows the user to use a name different from the terminal name assigned to the terminal device 30 as a terminal name for the use of the image transmission/reception service.

1.3 Flow of Process

Figure 4:
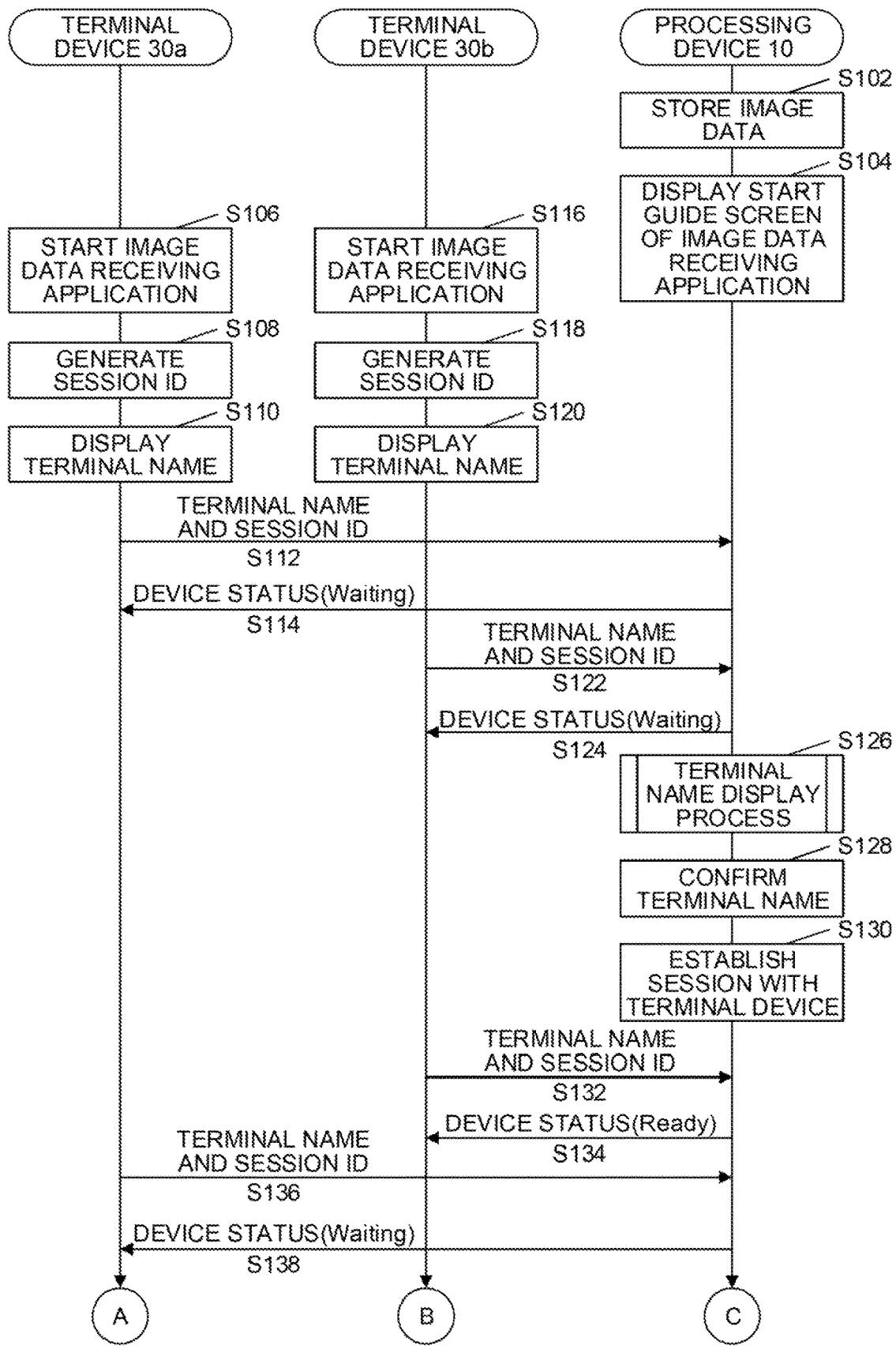
FIG. 4 is a diagram for explaining a flow of a process according to the first embodiment.

A flow of a process according to the present embodiment will be described with reference to FIG. 4 to FIG. 6. FIG. 4 and FIG. 5 are sequence diagrams for explaining the flow of the process in the processing device 10 and the terminal device 30. In the sequence diagrams of FIG. 4 and FIG. 5, A, B, and C in FIG. 4 correspond to A, B, and C in FIG. 5, respectively. FIG. 6 is a flowchart of a terminal name display process being performed by the processing device 10. Regarding FIG. 4 and FIG. 5, the description will be made on the assumption that there are two terminal devices 30, which are referred to as a terminal device 30*a* and a terminal device 30*b*. Moreover, regarding the terminal device 30, the description will be made on the assumption that the SSID of the access pointer 130 is designated in advance as a destination to which the wireless communicator 310 is to be connected by the user.

First, with reference to FIG. 4, description will be made on a flow of a process from connection of the terminal device 30 to the processing device 10 to establishment of a session. Initially, the controller 100 receives image data of a document read by the document reader 220 through the communicator 210 and the communicator 140. The controller 100 then stores the received image data in the image data storage area 152 (S102). Subsequently, the controller 100 causes the display 110 to display a screen (start guide screen) for prompting the start of the image data receiving application 354 (S104). The start guide screen may include an icon of the image data receiving application 354, an explanation of an operation being performed by a user after the start of the image data receiving application 354, or both.

Subsequently, the terminal device 30*a* starts the image data receiving application 354 on the basis of the operation by the user (S106). This allows the controller 300 to perform the function implemented by the image data receiving application 354. The controller 300 generates a session ID used for connection to the processing device 10 by the function of the image data receiving application 354 (S108).

The controller 300 also causes the display 320 to display a terminal identifier, or terminal name, of the terminal device 30a (S110).

Subsequently, the controller 300 achieves the connection to the processing device 10 and transmits a signal containing the terminal name and the session ID to the processing device 10 (S112). In response to receiving the terminal name and the session ID, the controller 100 transmits device status information, which indicates a status of the processing device 10 and the image forming device 20, to the terminal device 30a, or source of transmission (S114).

The device status refers to information indicating, in the processing device 10, which status the image transmission/reception service is in. In the present embodiment, the controller 100 transmits one of the following statuses as the device status to the terminal device 30.

1 Waiting

This status means that the image transmission/reception service is in a standby status for the terminal devices 30, that is, the processing device 10 is connected to each of the terminal devices 30 but establishes a session with none of the terminal devices 30. In this status, the terminal devices 30 cannot receive the image data from the processing device 10. Accordingly, the controller 100 transmits "Waiting" as the device status to the terminal devices 30 until the session is established. It should be noted that in a case where a session is established with any one of the terminal devices 30, the controller 100 may transmit "Waiting" to the other terminal device 30 with which no session has been established. The controller 100 can thus inform the user of the terminal device 30 that has received "Waiting" as the device status that the image data is not ready to transmit.

2 Ready

This status means that the image transmission/reception service is in a status where the terminal device to which the image data is to be transmitted has been determined, that is a session has been established between the processing device 10 and one of the terminal devices 30 and the terminal device 30 has got ready to receive the image data from the processing device 10. The controller 100 generates a session and transmits "Ready" as the device status to the terminal device 30 with which the session has been established until the user of the image transmission/reception service confirms that the information regarding the image data is correct.

3 Charging

This status means that the image transmission/reception service is in a status for payment. The controller 100 transmits "Charging" as the device status until the information regarding the image data is confirmed to be correct and a process for payment is completed.

4 Sending

This status means that the image transmission/reception service is in a status for transmission/reception of the image data. The controller 100 transmits "Sending" as the device status to the terminal device 30 with which the session has been established until the transmission of the image data is completed.

5 Finished

This status means that the image transmission/reception service is in a status for termination of the image transmission/reception service. Specifically, this status means that the transmission of the image data from the processing device 10 to the terminal device 30 has been completed and the payment process has also been completed in the processing device 10. In this status, the communication (connection) between the processing device 10 and the terminal device 30 may be disconnected. The controller 100 transmits "Finished" as the device status until the termination of the image transmission/reception service is confirmed by the user.

It should be noted that when the image transmission/reception service is in a status for reading a document, the controller 100 may transmit "Waiting" as the device status to the terminal device 30 or transmit a device status indicating that the document is being read (for example, "Scanning").

After generating the session ID, the controller 300 transmits the terminal name and the session ID to the processing device 10 at regular intervals (for example, every second), thereby performing polling to acquire the device status from the processing device 10. By doing so, each of the terminal devices 30 can determine whether or not a session has been established from the device status. In addition, the processing device 10 can acquire information such as the number, the terminal names, and the session IDs of the terminal devices 30 to be connected.

Here, in S114, the processing device 10 has not established a session with any of the terminal devices 30. Accordingly, the processing device 10 transmits "Waiting" as the device status to the terminal device 30a.

Meanwhile, in a case where the image data receiving application 354 is started in the terminal device 30b, which is the terminal device 30 different from the terminal device 30a, (S116), the same process as in the terminal device 30a is performed. In other words, the controller 300 of the terminal device 30b generates a session ID (S118) and causes the display 320 to display the terminal name of the terminal device 30b (S120). The controller 300 of the terminal device 30b also transmits a signal containing the terminal name and session ID to the processing device 10 (S122). In response to receiving the signal containing the terminal name and the session ID from the terminal device 30b, the processing device 10 transmits "Waiting" as the device status to the terminal device 30b (S124).

Subsequently, the controller 100 performs the terminal name display process (S126). The terminal name display process will be described with reference to FIG. 6. The terminal name display process is a process for the processing device 10 to cause the display 110 to display the information of the terminal device 30 with which the session is established, such as the terminal name.

First, the controller 100 determines whether or not the signal containing the terminal name and the session ID has been received from the terminal device 30 (step S182). If the signal containing the terminal name and the session ID has been received from the terminal device 30, the controller 100 generates the received signal strength list 154 on the basis of the received terminal name and session ID (step S184). Specifically, the controller 100 receives the signal containing the value of the strength of the received signal from the terminal device 30 for a predetermined period of time (for example, five seconds), performing the process for acquiring the value of the strength of the received signal from the terminal device 30. The controller 100 then generates the received signal strength list 154 on the basis of the value of the strength of the received signal of the terminal device 30 acquired for the predetermined period of time. It should be noted that in a case where the processing device 10 measures and acquires the value of the strength of the received signal of the terminal device 30, the processing device 10 may measure and acquire the value of the strength of the received signal of the terminal device 30 on the basis of the strength of the signal received by the processing device 10 from the terminal device 30 for the predetermined period of time, for example.

By making the time for acquiring the value of the strength of the received signal, it is possible for the controller 100 to appropriately acquire the value of the strength of the received signal of the terminal device 30 in a case where there are the plurality of terminal devices 30 or the processing device 10 acquires the value of the strength of the received signal at a time different from the time in S182. In addition, in a case of acquiring the value of the strength of the received signal twice or more times from the same terminal device 30, the controller 100 may define a last acquired value of the strength of the received signal as the value of the strength of the received signal of this terminal device 30 or define an average value as the value of the strength of the received signal of this terminal device 30.

Subsequently, if the received signal strength list 154 stores information regarding only the single terminal device 30 in step S186, when only information for one terminal device 30, the controller 100 causes the display 110 to display the terminal name of the terminal device 30 stored in the received signal strength list 154 (step S186; Yes→step S188).

Here, a status of storing information regarding only a single device means that the received signal strength list 154 stores information regarding the single terminal device 30 for the processing device 10 to communicate with. Accordingly, the received signal strength list 154 only needs to store the information regarding the single terminal device 30 that can be communicated with. For example, the received signal strength list 154 stores information regarding the plurality of terminal devices 30, one of which has a received signal strength equal to or more than a threshold.

Meanwhile, in a case where the received signal strength list 154 stores information regarding the plurality of terminal devices 30, the controller 100 extracts the terminal name of the terminal device 30 closest to the processing device 10 (step S186; No→step S190).

Here, the terminal device 30 closest to the processing device 10 is supposed to provide the received signal being strongest, which includes the terminal name and the session ID, among the other terminal devices 30. Accordingly, the controller 100 extracts the terminal name of the terminal device 30 that provides the strongest received signal by comparing the values of the strength of the received signal stored in the received signal strength list 154 or sorting the received signal strength list 154 in an order of received signal strength. The controller 100 then causes the display 110 to display the extracted terminal name of the terminal device 30 (step S192). Thus, even in the case of receiving the signals containing the terminal names and the session IDs of the plurality of terminal devices 30, it is possible to cause the display 110 to display the terminal name of the single terminal device 30.

Subsequently, referring back to FIG. 4, in response that the user performs a confirmation operation of the terminal name through the operation inputter 120 (S128), the controller 100 establishes a session with the terminal device 30 corresponding the terminal name displayed on the display 110 (S130). The confirmation operation of the terminal mime corresponds to selecting an "OK" button, which is displayed together with the terminal name by the controller 100, by the user, for example.

Subsequently, in response to receiving the signal containing the terminal name and the session ID from the terminal device 30 with which the session is established, the controller 100 transmits "Ready" as the device status to the terminal device 30 (S132→S134). In the present embodiment, it should be noted that "Waiting" is transmitted as the device status to the terminal device 30 with which no session is established, indicating that the image transmission/reception service is not available (S136→S138).

In FIG. 4, the processing device 10 has established a session with the terminal device 30b in S130. In this case, the processing device 10 transmits "Ready" as the device status to the terminal device 30b (S134). Meanwhile, the processing device 10 transmits "Waiting" as the device status to the terminal device 30a, with which no session has been established (S138). The processing device 10 can thus set the terminal device 30b as a terminal device to which the image data is to be transmitted. Meanwhile, the terminal device 30b can determine that the session has been established with the processing device 10.

Next, with reference to FIG. 5, description will be made on a process for the processing device 10 to transmit the image data to the terminal device 30. In the following description, it should be noted that the terminal device 30 with which the processing device 10 has established the session is the terminal device 30b as in FIG. 4. In addition, the functional units of the terminal device 30 are assumed to be the functional units of the terminal device 30b in the following description (for example, the controller 300 refers to the controller 300 of the terminal device 30b).

First, the controller 300 transmits a session ID to the processing device 10 (S142). The controller 100 compares the session ID received from the terminal device 30 with a session ID of the terminal device 30 with which the session has been established, namely, a session ID of the terminal device 30b. If the session ID received from the terminal device 30 matches the session ID of the terminal device 30b as a result of the comparison, the controller 100 transmits the image data stored in the image data storage area 152 to the terminal device 30b with which the session has been established (S144). By doing so, the processing device 10 can transmit the image data to the terminal device 30b in the background while the user is confirming transmission contents and fee.

Subsequently, the controller 130 causes the display 110 to display a transmission content confirmation screen, that is, a screen showing information regarding the image data transmitted to the terminal device 30b (S146). The user can confirm the information regarding the image data transmitted from the processing device 10 on the basis of the transmission content confirmation screen. The transmission content, confirmation screen also includes file name and file size of the image data transmitted by the controller 100 in S144 and a file path (folder name) of the image data storage area 352 to save the file.

Subsequently, the controller 130 causes the display 110 to display a fee confirmation screen, that is, a screen showing information regarding a usage fee for the image transmission/reception service (S148). The user pays the fee for the use of the image transmission/reception service on the basis of the fee confirmation screen. When the user pays the fee, the controller 100 transmits "Charging" as the device status to the terminal device 30b in response to a signal containing the terminal name and the session ID from the terminal device 30b (S150→S152). Moreover, the controller 100 performs a payment process for the fee charged for the image transmission/reception service on the basis of the operation for paying the fee by the user (S154).

In response to the completion of the payment process, the controller 100 displays a transmission confirmation screen, that is, a screen informing the user that the process for transmitting the image data to the terminal device 30b is going on (S156). The transmission confirmation screen displayed by the processing device 10 allows the user of the image transmission/reception service to know that the process has been completed up to the payment of the fee and it is only necessary to wait until the reception of the image data is completed.

Subsequently, in response to receiving the signal containing the terminal name and the session ID from the terminal device 30b, the controller 100 transmits "Sending" as the device status to the terminal device 30b (S158→S160). In response to receiving "Sending" as the device status from the processing device 10, the controller 300 can determine that the process has been completed up to the payment of the fee, proceeding to a phase of transmitting the image data.

Then, the controller 100 causes the display 110 to display an image data transmitting screen indicating that the image data is being transmitted until the transmission of the image data to the terminal device 30b is completed (S162). Meanwhile, the controller 300 causes the display 320 to display an image data receiving screen indicating that the image data is being received until the reception of the image data from the processing device 10 is completed (S164).

When the transmission of the image data to the terminal device 30b is completed, the controller 100 transmits "Finished" as the device status to the terminal device 30b in response to receiving a signal containing the terminal name and the session ID from the terminal device 30b with which the session has been established (S136→S168). In response to receiving "Finished" as the device status from the processing device 10, the controller 300 causes the display 320 to display a reception completion screen indicating the reception of the image data has been completed (S170). In addition, the controller 300 transmits reception completion information, that is, information indicating that the reception has been completed, to the processing device 10 (S172).

In response to receiving the reception completion information from the terminal device 30b, the controller 100 causes the display 110 to display a screen indicating that the image transmission/reception service has terminated, asking the user to confirm the termination of the service (S174). In response that the user confirms the termination of the service, the controller 100 disconnects the session with the terminal device 30b (S176). In S176, the controller 100 may terminate the connection to the terminal device 30b. Incidentally, confirming the termination of the service by the user corresponds to selecting an "OK" button, which is included in the screen indicating that the image transmission/reception service has terminated, by the user, for example.

1.4 Operation Example

An operation example will be described with reference to FIG. 7 to FIGS. 11A to 11D. FIG. 7 to FIG. 9 are diagrams that illustrate display screens to be displayed on the display 110 of the processing device 10 and the display 320 of the terminal device 30. The display screens are arranged in a time series. An upper tier in each figure corresponds to a display screen to be displayed on the display 110 of the processing device 10 and a lower tier in each figure corresponds to a display screen to be displayed on the display 320 of the terminal device 30. Display screens in the upper and lower tiers that are arranged at laterally the same positions are display screens to be displayed on the respective displays at the same time.

A display screen W100 in FIG. 7, which is a screen displayed on the display 110 of the processing device 10, shows a preview of the image data of the document read by the image forming device 20. When the user selects a "NEXT" button B100 included in the display screen W100, the processing device 10 causes the display 110 to display a start guide screen W102 of the image data receiving application 354.

When the image data receiving application 354 is started in the terminal device 30 by the operation of the user, the terminal device 30 causes the display 320 to display a display screen W104 of the image data receiving application 354. Here, when the user selects a "SCAN" button B104, the terminal device 30 generates a session ID and transmits the terminal name and the session ID to the processing device 10.

After generating the session ID, the terminal device 30 causes the display 320 to display a display screen W110 for prompting the user to look at the display 110 of the processing device 10 (FIG. 8). Meanwhile, after performing the terminal name display process, the processing device 10 causes the display 110 to display a display screen W112 showing the terminal name, that is, information of the terminal device 30 with which a session is to be established. After the terminal device 30 with which the session is to be established is determined, the processing device 10 may automatically switch the screen displayed on the display 110 from the start guide screen W102 to the display screen W112 and display the display screen W112. This eliminates the necessity for the user of the image transmission/reception service to enter information such as a personal identification number (PIN) code or a password to the processing device 10 with an improved operability.

Meanwhile, the terminal device 30 causes the display 320 to display a display screen W114 that shows the terminal name, which is information of the terminal device 30 operated by the user. It should be noted that the terminal device 30 may cause the display screen W114 to be displayed in response that the user of the image transmission/reception service operates, such as taps, the display screen W110. In addition, the display screen W114 may include a message for confirming that the information of the terminal device 30 is displayed on the display 110 of the processing device 10. In addition, as illustrated in the display screen W112 and the display screen W114, the terminal name, which is the information of the terminal device 30, may be displayed in larger characters than other information. Thus, the terminal name, which is the information of the terminal device 30, is displayed on the display 110 of the processing device 10 and the display 320 of the terminal device 30. The user can confirm that the terminal device 30 with which the session is to be established (connected to the processing device 10) is the terminal device 30 operated by the user by looking at the display 110 and the display 320. It should be noted that the display screen W112 and the display screen W114, which only have to display the information of the terminal device 30, may show a terminal identifier other than the terminal name, information of the terminal device 30 other than the terminal identifier, or both.

When confirming that the terminal name shown by the display screen W112 matches the terminal name shown by the display screen W114, the user selects an "OK" button B112a. In response that the user selects the button B112a, the processing device 10 establishes a session with the terminal device 30 corresponding to the terminal name displayed on the display 110. It should be noted that when confirming that the terminal name shown by the display screen W112 docs not match the terminal name shown by the display screen WIN, the user selects a "FIND OTHER TERMINALS" button B112b. In response that the user selects the button B112b, the processing device 10 again performs the terminal name display process and redisplays the terminal name of the terminal device 30 closest to the processing device 10.

Subsequently, the processing device 10 causes the display 110 to display a transmission content confirmation screen W116. When confirming that transmission contents are correct, the user selects a "NEXT" button B116. In response that the user selects the button B116, the processing device 10 causes a screen for prompting payment for the image transmission/reception service.

The processing device 10 causes the display 110 to display a fee confirmation screen W120 to perform the payment process (FIG. 9). The fee confirmation screen W120 may include, for example, a button for selecting payment options, a button for selecting whether or not a receipt is to be issued, or both in addition to showing the fee for the service. In response that the user has paid the fee, the processing device 10 causes the display 110 to display an image data transmitting screen W122. Meanwhile, the terminal device 30 causes the display 320 to display an image data receiving screen W124.

When completing the transmission of the image data to the terminal device 30, the processing device 10 causes the display 110 to display a termination confirmation screen W126. Meanwhile, the terminal device 30 causes the display 320 to display a screen W128 showing that the reception of the image data is completed. This allows the user to know that the image data of the document scanned by the image forming device 20 has been stored in the image data storage area 352.

Figure 10A:
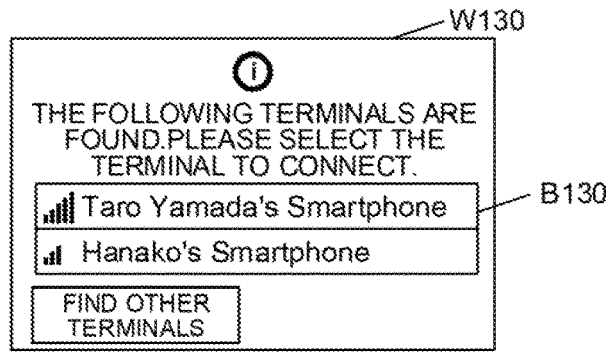
FIGS. 10A to 10C are diagrams for explaining an operation example according to the first embodiment.

In the terminal mime display process according to the present embodiment, in the case of receiving signals containing terminal names and session IDs of a plurality of terminal devices, the controller 100 causes the display name of the terminal device 30 with the strongest received signal to be displayed but such a display is not limitative. For example, in the case of receiving signals containing terminal names and session IDs of a plurality of terminal devices, the terminal names of the plurality of terminal devices 30 may be displayed in list form as illustrated in FIG. 10A. At this time, the terminal names may be displayed on the basis of the strength of the received signal or sorted in descending order in accordance with the strength of the received signal. This makes it easy for the user to select an item of the same terminal name as the terminal name of the terminal device 30 operated by the user from the list. It should be noted that examples of displaying the terminal names on the basis of the strength of the received signal include displaying an image (for example, an antenna icon) indicating the strength of the received signal, changing a background color of the item (for example, increasing a depth of the background color with an increase in the strength of the received signal), and changing a font size, a font color, or both.

The case where the controller 100 receives signals containing terminal names and session IDs of a plurality of terminal devices corresponds to a case where the image data receiving application 354 is started in the plurality of terminal devices 30. In this case, the display 320 of each of the terminal devices 30 displays the terminal name of the corresponding terminal device 30. The user who operates the processing device 10 selects an item of the same terminal name as the terminal name displayed on the display 320 from a display screen W130. The processing device 10 establishes a session with the terminal device 30 corresponding to the selected terminal name.

Figure 10B:
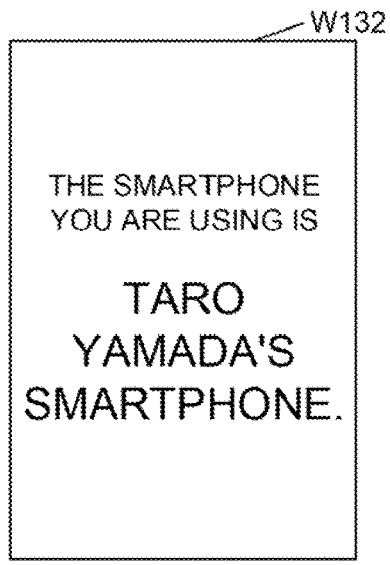
Figure 10C:
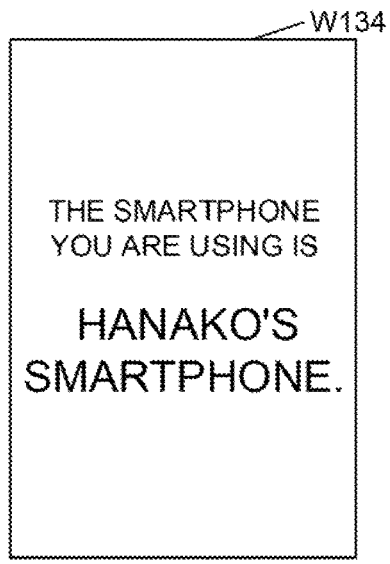

For example, it is assumed that a display screen W132 of FIG. 10B or a display screen W134 of FIG. 10C is displayed on the display 320 of each of the plurality of terminal devices 30. In addition, it is assumed that the display screen W132 is displayed on the display 320 of the terminal device 30 operated by the user closest to the processing device 10. At this time, the user of terminal device 30 with the display screen W132 displayed on the display 320 selects an item B130 from a list shown in the display screen W130 as illustrated in FIG. 10A. A session can thus be established between the processing device 10 and the terminal device 30 closest to the processing device 10.

Figure 11A:
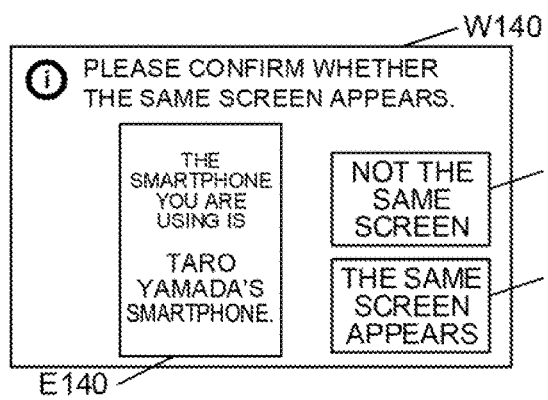
FIGS. 11A to 11D are diagrams for explaining an operation example according to the first embodiment.

FIG. 11A illustrates a case of displaying a display screen W140 instead of the display screen W112 of FIG. 8. The display screen W112 of FIG. 8 shows the terminal name, that is, the information identifying the terminal device 30, whereas the display screen W140 includes an area E140 where the same screen as a screen displayed on the display 320 of the terminal device 30 appears as illustrated in FIG. 11A. By displaying the display screen W140 on the display 110 instead of the display screen W112, the processing device 10 allows the user to visually more readily determine whether or not the terminal device 30 to which the image data is to be transmitted is appropriate.

In response that, a button B140 indicating that the screen appearing in the area E140 of the display screen W140 of the processing device 10 matches a display screen W142 displayed on the display 320 of the terminal device 30 is selected, the processing device 10 may start a process for transmitting the image data. Meanwhile, in response that a button B142 indicating that the screen appearing in the area E140 of the display screen W140 of the processing device 10 is different from the display screen W142 displayed on the display 320 of the terminal device 30 is selected, the processing device 10 may again perform the terminal name display process.

Figure 11C:
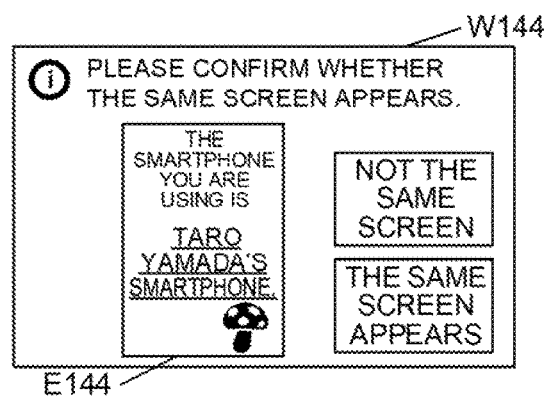
Figure 11B:
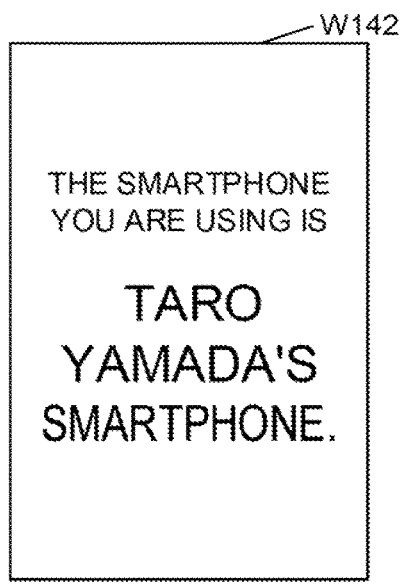
Figure 11D:
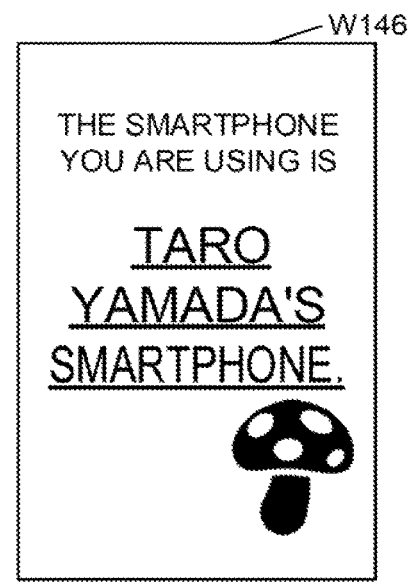

In addition, in the case where the processing device 10 and the terminal device 30 display the same screen, a display mode such as displaying an icon, emphasizing characters in the screen, or adding a background color may be applied. By doing so, it is possible to visually readily show the user that the same screen is displayed irrespective of characters, etc. For example, FIG. 11C illustrates a case where a display screen W144 is displayed on the display 110 of the processing device 10 and FIG. 11D illustrates a case where a display screen W146 is displayed on the display 320 of the terminal device 30. The same screen as the display screen W146 appears in an area E144 of the display screen W144. At this time, the screen appearing in the area E144 and the display screen W146 are emphasized by, for example, underlining the terminal name and displaying a graphic at a lower right of the display screen. The user can determine whether the terminal device 30 to which the image data is to be transmitted is the appropriate terminal device 30 on the basis of the display mode of the screen.

Of course, the process described above may be modified within a consistent range. For example, a terminal name display processing device may extract the terminal name of the closest terminal device by a method where no received signal strength list is generated. Specifically, the controller 100 extracts the terminal name of the closest terminal device by temporarily storing a value of a maximum received signal strength and comparing a value of the strength of the received signal obtained from the terminal device 30 together with the terminal name with the value of the maximum received signal strength. The controller 100 first stores a small value, such as −100 dBw, as the maximum received signal strength in the storage 150. Then, after receiving a signal containing the terminal name and a value of the strength of the received signal from the terminal device 30 for a predetermined period of time (for example, five seconds), the controller 100 compares the value of the strength of the received signal with the value of the maximum received signal strength. If the value of the strength of the received signal received from the terminal device 30 is larger than the value of the maximum received signal strength, the value of the strength of the received signal and the terminal name received from the terminal device 30 are stored (the value of the maximum received signal strength is updated) in the storage 150. Then, after the elapse of the predetermined period of time, the terminal name stored in the storage 150 is extracted as the terminal name of the terminal device closest to the processing device 10. The controller 100 extracts the terminal name stored in the storage 150 is extracted as the terminal name closest to the processing device 10. The terminal name of the terminal device 30 closest to the processing device 10 can thus be extracted on the basis of the signal received from the terminal device 30 for the predetermined period of time.

In S134, the controller 100 may transmit, a uniform resource locator (URL) for acquiring the image data stored in the image data storage area 152 together with the device status "Ready." At this time, the session ID may be included in the URL. This allows the controller 300 to request acquisition of a resource indicated by the URL including the session ID to the processing device 10 in S142. Since being able to acquire the session ID from the URL, the controller 100 can eliminate a request for acquisition of image data from the terminal device 30 with which no session has been established.

In S144, instead of transmitting the image data as it is, the controller 100 may integrate a plurality of pieces of image data into a single piece of data or compress the plurality of pieces of data for transmission. This can increase an efficiency in the transmission of the image data.

In the above description, although the terminal name of the terminal device 30 is used as the information of the terminal device 30 for establishing a session, information other than the terminal name may be used. For example, information such as an account name of the user of the terminal device 30, a terminal identifier other than the terminal name (an ID or a serial number of the terminal device 30), a name, a telephone number, or an electronic mail address may be used as the information identifying the terminal device 30. The terminal device 30 transmits the information identifying the terminal device 30 to the processing device 10 together with the session ID. The controller 100 also generates the received signal strength list 154 in association with the session ID and the information identifying the terminal device 30. Then, in step S186 and step S192, the information (for example, account name) used as the information identifying the terminal device 30 is displayed on the display 110. The user of the terminal device 30 possibly uses information such as the account name, the mime, the telephone number, or the electronic mail address more frequently than the terminal name. In such a case, the user can more readily determine whether or not the terminal device 30 with which a session is to be established is appropriate. In addition, since the ID or the serial number of the terminal device 30 is not information related to privacy of the user, it is possible to reduce hesitation of the user as compared with a case where the terminal name or the account name is displayed. The information used for establishing a session may be determined by, for example, an administrator of the system 1 on the basis of attributes of the user who uses the image transmission/reception service, an installation location of the processing device 10, etc.

Moreover, the image processing apparatus 25 of the above embodiment exemplarily includes the processing device 10 and the image forming device 20 that are separate devices. However, the image processing apparatus 25 may include the processing device 10 and the image forming device 20 that are integrated.

According to the present embodiment, it is possible to display the terminal name of the terminal device closest to the image processing apparatus. A user of the image processing apparatus can thus establish a session between the image processing apparatus and the terminal device to receive image data from the image processing apparatus simply by confirming the terminal name displayed by the image processing apparatus. In addition, the operation can be simplified, thereby improving usability. Meanwhile, the user can identify the terminal device to which the image data is to be transmitted by the terminal name, making sure that the image data is to be transmitted to the terminal device owned by the user. Since it is possible to redisplay the terminal name displayed by the image processing apparatus by the operation of the user, the user can readily cope with a case where the image processing apparatus displays nothing.

In addition, the image processing apparatus extracts the terminal device with which a session is to be established on the basis of the strength of the received signal from the terminal device. Thus, even if a plurality of users stand in a line in front of the image processing apparatus, it is less likely that a session is established with the terminal device of any user other than the user who operates the image processing apparatus. Therefore, it is possible to ensure security while simplifying the operation.

In addition, the present embodiment can eliminate the necessity for the user to enter a PIN code to connect the terminal device and the image processing apparatus. Thus, it is possible to identify the terminal device that is the destination of transmission by a way simpler than using the PIN code.

2. Second Embodiment

Next, a second embodiment will be described. The second embodiment is an embodiment where if the plurality of terminal devices 30 having the same information as information of the terminal devices 30 are connected, the transmission of the image data is stopped. The present embodiment is an embodiment provided by replacing FIG. 6 regarding the first embodiment with FIG. 12. It should be noted that the same reference numerals are used to refer to the same functional limits and processes and the explanations thereof are omitted.

Figure 12:
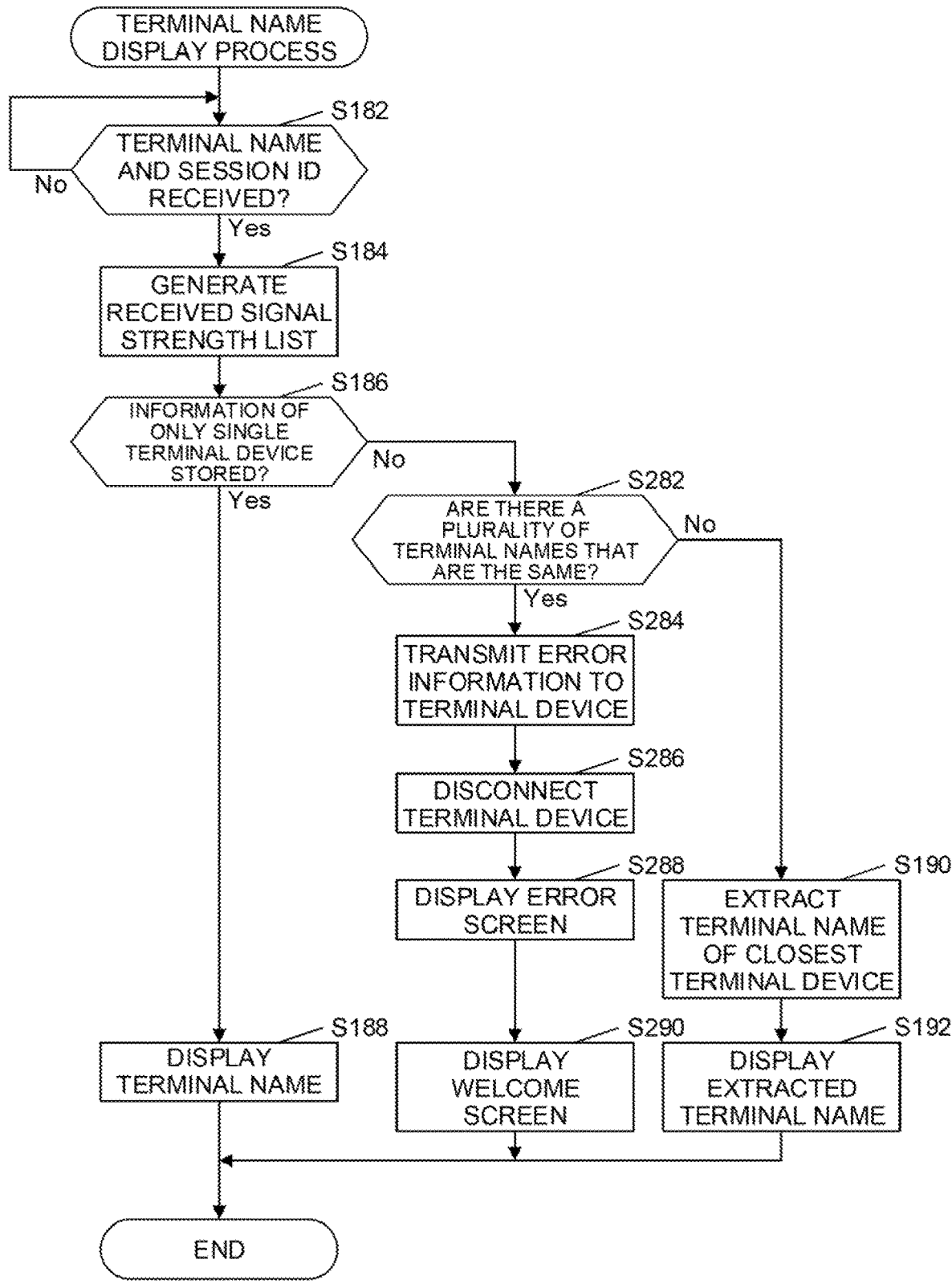
FIG. 12 is a flowchart for explaining a flow of a terminal name display process according to a second embodiment.

With reference to FIG. 12, a terminal name display process according to the present embodiment will be described. Although the terminal name is used as the information of the terminal device 30 in the description of the process, the account name of the user or a terminal identifier other than the terminal name may be used as the information of the terminal device 30.

In step S186, if pieces of information of the plurality of terminal devices 30 are stored in the received signal strength list 154, the controller 100 then determines whether or not a plurality of pieces of information indicating the same terminal name are present in the received signal strength list 154 (step S186: No→step S282). If the plurality of pieces of information indicating the same terminal name are present, the controller 100 transmits error information to all the terminal devices 30 connected to the processing device 10 (step S282; Yes→step S284). It should be noted that in response to receiving the error information, the terminal devices 30 each cause the display 320 to display a screen showing occurrence of an error.

In addition, the controller 100 terminates the connection to the terminal devices 30 to which the error information has been transmitted (step S286). The controller 100 then causes the display 110 to display an error screen showing that it is not possible to continue the operation due to the presence of the plurality of pieces of information indicating the same terminal name (step S288).

In response that the user confirms the error screen by performing a predetermined operation, the controller 100 stops the image transmission/reception service and causes the display 110 to display a welcome screen (step S290). The welcome screen is a screen for selecting a service provided by the processing device 10. After displaying the welcome screen, the controller 100 deletes the information of the operation having been performed by the user and the image data having been acquired from the image forming device 20. Moreover, step S128 and the subsequent steps in FIG. 4 are not to be performed.

With reference to FIG. 13, an operation example according to the present embodiment will be described. After causing the display 320 to display a display screen W200 showing the terminal name, each of the terminal devices 30 transmits a signal containing the terminal name and the session ID to the processing device 10. If the terminal names received from the plurality of terminal devices 30 include a plurality of terminal names that are the same, the processing device 10 transmits error information to the terminal devices 30 and causes the display 110 to display an error screen W202. At this time, the error screen W202 may show the plurality of terminal names that are the same. Meanwhile, in response to receiving the error information from the processing device 10, the terminal devices 30 may each cause the display 320 to display an error screen W204 showing occurrence of an error.

In response that the user selects an "OK" button B202 included in the error screen W202, the processing device 10 causes the display 110 to display a welcome screen W206. Meanwhile, in response that the user selects an "OK" button B204 included in the error screen W204, the terminal devices 30 each cause the display 320 to display a welcome screen W208 of the image data receiving application 354.

According to the present embodiment, if a plurality of pieces of information indicating the same terminal name are received, it is possible to abandon the operation performed by the user. This can prevent the image processing apparatus from wrongly transmitting the image data to a user different from the user who operates the image processing apparatus and prevent the image data from being stolen by a user different from the user who operates the image processing apparatus.

3. Third Embodiment

Next, a third embodiment will be described. The third embodiment is an embodiment where session-unique information is displayed together with the information of the terminal device 30 in the terminal name display process. For example, a part of the session ID (specifically, the first four characters of the session ID) is displayed as an identification number. This allows the user to confirm the terminal device 30 with which a session is to be established by the terminal name and the identification number.

Figure 14A:
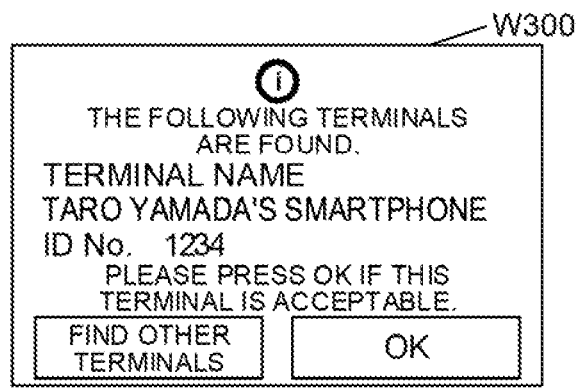
FIGS. 14A and 14B are diagrams for explaining an operation example according to a third embodiment.
Figure 14B:
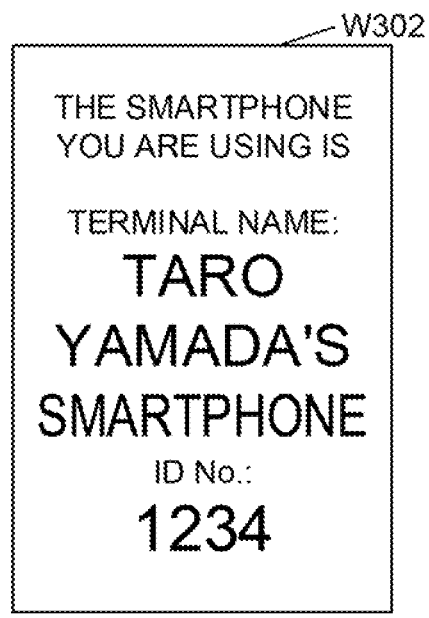

FIG. 14 is an operation example according to the present embodiment. In step S188 and step S192 of the terminal name display process, the controller 100 causes the display 110 to display the terminal name and the session unique information as in a display screen W300 of FIG. 14A. Meanwhile, in S110 or S120, the controller 300 causes the session-unique information together with the terminal name as in a display screen W302 of FIG. 14B.

It should be noted that the session-unique information may be information based on the session ID as described above or, alternatively, data generated by the terminal device 30 in being connected to the processing device 10. The information displayed on each of the display 110 and the display 320 may include a combination of the terminal name and information other than the identification number.

Moreover, even if the plurality of terminal devices 30 having the same information are connected, displaying the session-unique information allows the user to determine whether or not the terminal device 30 to which a session is to be established is correct Thus, unlike the second embodiment, the present embodiment allows for implementation without the necessity of abandoning the operation performed by the user even if the plurality of terminal devices 30 having the same information are connected.

According to the present, embodiment, the user of the image processing apparatus can confirm the terminal device to which the image data is to be transmitted by himself/ herself with a higher accuracy.

4. Fourth Embodiment

Next, a fourth embodiment will be described. In the fourth embodiment, the description will be made on a case where the terminal device 30 fails to accurately store the image data. It should be noted that the operations according to the above first to third embodiments are common to the present embodiment and only a different part will be described.

In a case where the terminal device 30 fails to appropriately receive or store the image data, the terminal device 30 performs a stop process. The terminal device 30 performs the stop process, causing the display 110 of the terminal device 30 to display "Receiving the image data has failed", "Storing the image data has failed", or the like.

In addition, the terminal device 30 provides to the image processing apparatus 25 (processing device 10) a notification indicating that the image data cannot be appropriately processed (process stop). In response to receiving the notification of the process stop from the terminal device 30, the image processing apparatus 25 stops the processes.

For example, the image processing apparatus 25 deletes the image data from the image data storage area 152. The image processing apparatus 25 also deletes the information of the terminal device 30 stored in the received signal strength list 154. In addition, in a case where the payment process has been performed, the image processing apparatus 25 performs a cancel process.

In this regard, the failure of the terminal device 30 to receive or store the image data is supposed to occur in the following cases.

An amount of space (remaining capacity) for storing of the storage 350 (image data storage area 352) of the terminal device 30 is not sufficient to store the received image data.

A remaining battery charge of the terminal device 30 is not sufficient to complete the process.

A communication cannot be appropriately performed clue to a drop of a reception strength of the terminal device 30 equal to or less than a threshold.

Other reasons such as interruption by the user or the system to stop the process

5. Modification Examples

The present invention is not limitative to the above embodiments but may be modified in a variety of manners. In other words, any embodiment provided by combining techniques modified as necessary without departing from the spirit of the present, invention is within the technical scope of the present invention.

In addition, parts described separately in the above embodiments for the convenience of explanation may, of course, be implemented in combination if technically possible.

It should be noted that the above embodiments are described on the assumption that the processing device 10 of the image processing apparatus 25 performs the processes and causes the display 110 of the processing device 10 to perform display. For example, the image forming device 20 may include the functions of the processing device 10, allowing the image forming device 20 to perform the processes. In addition, the processing device 10 may cause a display (not illustrated) of the image forming device 20 to perform display.

The program to be executed in each device in the embodiments is a program that controls a CPU, etc. (a program that enables a computer to function) to implement the above functions of the embodiments. Furthermore, information to be handled by these devices is temporarily stored in a temporary storage (for example, RAM) during the corresponding process. The information is then loaded in a storage such as various types of read only memory (ROM), HDD, etc. and read by the CPU for correction or writing if necessary.

In this regard, a recording medium for loading the program may lie any one of semiconductor media such as ROM and nonvolatile memory, optical recording media and magnetooptical recording media such as digital versatile disc (DVD) T magneto optical disc (MO), mini disc (MD), compact disc (CD), and Blu-ray Disc (BD) (trademark), magnetic recording media such as magnetic tape and flexible disk, and the like. Moreover, when the loaded program is executed, not only the above functions of the above embodiments are implemented but also the functions of the present invention may be implemented as a result of a process being performed on the basis of instructions from the program in cooperation with an operating system, another application program, or the like.

Moreover, for distribution into the market, the program may be loaded in a portable recording medium and distributed or may be transferred to a server computer connected through a network such as the Internet. In this case, a storage of the sever computer is, of course, within the scope of the present invention.

DESCRIPTION OF REFERENCE NUMERALS 1 system
10 processing device
100 controller
110 display
120 operation inputter
130 access pointer
140 communicator
150 storage
152 image data storage area
154 received signal strength list
20 image forming device
200 controller
210 communicator
220 document reader
230 image processor
240 image former
250 storage
25 image processing apparatus
30 terminal device
300 controller
310 wireless communicator
320 display
330 operation inputter
340 received signal strength measure
350 storage
352 image data storage area
354 image data receiving application
356 terminal device information

What is claimed is:

1. A connection system comprising:
a terminal device; and
an image processing apparatus,
the terminal device including:
a first controller;
a first communicator; and
a first display, and
the image processing apparatus including:
a second controller;
a second communicator; and
a second display,
wherein the first controller of the terminal device causes the first display to display information of the terminal device when the terminal device is connected to the image processing apparatus through the first communicator,
wherein the second controller of the image processing apparatus causes the second display to display the information of the terminal device when the terminal device is connected to the image processing apparatus through the second communicator, and
wherein the second controller of the image processing apparatus:
causes the second display to display a screen prompting a user to connect the terminal device to the image processing apparatus; and
makes, when the terminal device is connected to the image processing apparatus through the second communicator, an automatic switch from the screen prompting the user to connect the terminal device to the image processing apparatus to a screen including the information of the terminal device that is identical to information displayed on the first display, to cause the second display to display the screen including the information of the terminal device that is identical to the information displayed on the first display.

2. The connection system according to claim 1, wherein the information of the terminal device displayed on the first display is identical to the information of the terminal device displayed on the second display.

3. The connection system according to claim 1, wherein the information of the terminal device is coincidently displayed on the first display and the second display.

4. The connection system according to claim 1, wherein the second controller of the image processing apparatus transmits image data to the terminal device through the second communicator when a user performs a confirmation operation after the information of the terminal device is displayed on the second display.

5. The connection system according to claim 1, wherein, in causing the first display to display the information of the terminal device, the first controller of the terminal device causes a message for confirming that the information of the terminal device is displayed on the second display to be displayed.

6. The connection system according to claim 1, wherein the second controller of the image processing apparatus causes the information of the terminal device to be displayed larger than other information.

7. The connection system according to claim 1, wherein the information of the terminal device includes a terminal identifier for uniquely identifying the terminal device.

8. The connection system according to claim 7, wherein the terminal identifier includes at least one of a terminal name of the terminal device, a serial number of the terminal device, an address of the terminal device, a user name, an electronic mail address, and a telephone number.

9. An image processing apparatus comprising:
   a communicator that is connected to a terminal device, the terminal device displaying information of the terminal device on a display of the terminal display when the terminal device is connected to the image processing apparatus;
   a controller; and
   a display,
   the controller causing the display to display information of the terminal device when the terminal device is connected to the image processing apparatus through the communicator,
   wherein the controller:
   causes the display to display a screen prompting a user to connect the terminal device to the image processing apparatus; and
   makes, when the terminal device is connected to the image processing apparatus through the communicator, an automatic switch from the screen prompting the user to connect the terminal device to the image processing apparatus to a screen including the information of the terminal device that is identical to information displayed on the display of the terminal device, to cause the display to display the screen including the information of the terminal device that is identical to the information displayed on the display of the terminal device.

10. A communication method for performing communication between an image processing apparatus and a terminal device, the communication method comprising:
   displaying, on a display of the image processing apparatus, a screen prompting a user to connect the terminal device to the image processing apparatus;
   establishing the communication between the terminal device and the image processing apparatus;
   displaying a terminal name of the terminal device on a display of the terminal device after the communication is established;
   making an automatic switch from the screen prompting the user to connect the terminal device to the image processing apparatus to a screen including the terminal name of the terminal device that is identical to the terminal name displayed on the display of the terminal device after the communication is established, to cause the display of the image processing apparatus to display the screen including the terminal name of the terminal device that is identical to the terminal name displayed on the display of the terminal device; and
   transmitting image data from the image processing apparatus to the terminal device after identical terminal names are displayed on the display of the terminal device and the display of the image processing apparatus, respectively.

* * * * *